United States Patent
Choi et al.

(10) Patent No.: US 9,429,682 B2
(45) Date of Patent: Aug. 30, 2016

(54) METHOD FOR PREPARING ACRYLIC COPOLYMER RESIN FOR OPTICAL FILM AND METHOD FOR FABRICATING OPTICAL FILM USING THE SAME

(75) Inventors: Eun-Jung Choi, Daejeon (KR);
Chang-Hun Han, Daejeon (KR);
Jae-Bum Seo, Daejeon (KR);
Beom-Seok Kim, Daejeon (KR);
Byoung-Il Kang, Daejeon (KR);
Nam-Jeong Lee, Daejeon (KR);
Su-Kyung Kim, Daejeon (KR);
Jun-Geun Um, Daejeon (KR); Da-Eun Sung, Daejeon (KR); Joong-Hoon Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 379 days.

(21) Appl. No.: 14/006,267

(22) PCT Filed: Feb. 7, 2012

(86) PCT No.: PCT/KR2012/000869
§ 371 (c)(1),
(2), (4) Date: Sep. 19, 2013

(87) PCT Pub. No.: WO2012/141422
PCT Pub. Date: Oct. 18, 2012

(65) Prior Publication Data
US 2014/0015152 A1  Jan. 16, 2014

(30) Foreign Application Priority Data

Apr. 13, 2011 (KR) .................. 10-2011-0034443
Aug. 23, 2011 (KR) .................. 10-2011-0083999

(51) Int. Cl.
*G02B 1/04* (2006.01)
*B29D 7/01* (2006.01)
*C08F 220/14* (2006.01)
*G02B 5/30* (2006.01)

(52) U.S. Cl.
CPC . *G02B 1/04* (2013.01); *B29D 7/01* (2013.01); *C08F 220/14* (2013.01); *G02B 5/3025* (2013.01)

(58) Field of Classification Search
CPC ...................................................... G02B 1/04
See application file for complete search history.

(56) References Cited

U.S. PATENT DOCUMENTS

| 4,789,709 | A | 12/1988 | Kato et al. |
| 4,874,824 | A | 10/1989 | Hallden-Abberton et al. |
| 2009/0275718 | A1 | 11/2009 | Um et al. |
| 2011/0009585 | A1 | 1/2011 | Yonemura et al. |
| 2011/0130535 | A1 | 6/2011 | Yonemura et al. |

FOREIGN PATENT DOCUMENTS

| EP | 0264508 | | 11/1991 |
| JP | 61-254608 | A | 11/1986 |
| JP | 2008101202 | A | 5/2008 |
| JP | 2009227720 | A | 10/2009 |
| JP | 2009292869 | A | 12/2009 |
| JP | 2011511101 | A | 4/2011 |
| KR | 10-2010-0097183 | | 9/2010 |
| KR | 10-2010-0104518 | | 9/2010 |
| WO | 2010013557 | A1 | 2/2010 |

*Primary Examiner* — Larry Thrower
(74) *Attorney, Agent, or Firm* — Dentons US LLP

(57) ABSTRACT

There is provided a method for preparing an acrylic copolymer resin for an optical film includes: suspension-polymerizing an acrylic monomer containing a benzene ring, an alkyl(meth)acrylate monomer, and a (meth)acrylic acid monomer to prepare a copolymer; and thermally treating the copolymer at a temperature ranging from 240° C. to 300° C. As the method for preparing an acrylic copolymer of the present invention, a resin having an effectively lowered CTE can be manufactured by inducing the formation of a glutaric anhydride structure by using suspension polymerization that facilitates adjustment of the molecular weight of a resin.

13 Claims, No Drawings

METHOD FOR PREPARING ACRYLIC COPOLYMER RESIN FOR OPTICAL FILM AND METHOD FOR FABRICATING OPTICAL FILM USING THE SAME

This application is a National Phase Entry of International Application No. PCT/KR2012/000869, filed Feb. 7, 2012, and claims priority to and the benefit of Korean Patent Application Nos. 10-2011-0034443, filed Apr. 13, 2011, and 10-2011-0083999, filed Aug. 23, 2011, the disclosures of which are incorporated herein by reference in their entirety.

TECHNICAL FIELD

The present invention relates to a method for preparing a resin for an optical film and, more particularly, to a method for fabricating an acrylic copolymer resin having excellent thermal stability.

BACKGROUND ART

Recently, based on the development of optical technologies, display techniques using various schemes, such as a plasma display panel (PDP), a liquid crystal display (LCD), and the like, replacing the conventional Cathode Ray Tube, have been proposed and have become available on the market.

Advanced level requirements are required for a polymer material used for such displays. For example, in case of LCDs, as LCDs are becoming thinner, lighter, and larger in terms of screen area, obtaining a wide viewing angle and a high contrast ratio, suppressing of a change in an image color according to a viewing angle, and making a screen display uniform have become particularly significant issues.

Accordingly, various polymer films are used for a polarization film, a polarizer protective film, a retardation film, a plastic substrate, a light guide plate, and the like, and various modes of LCD devices using twisted nematic (TN), super-twisted nematic (STN), vertical alignment (VA), in-plane switching (IPS) liquid crystal cells, and the like, as liquid crystal have been developed. These liquid crystal cells have a unique liquid crystal arrangement, respectively having a unique optical anisotropy, and, in order to compensate for the optical anisotropy, films obtained by stretching various types of polymers and providing retardation function thereto have been proposed.

A polarization plate generally has a structure in which a triacetyl cellulose film (TAC) film is laminated on a polarizer as a protective film, using a water-based adhesive made of a polyvinylalcohol-based aqueous solution. In this respect, however, neither the polyvinylalcohol film used as a polarizer nor the TAC film used as a polarizer protective film have sufficient heat and moisture resistance. Thus, when the polarization plate comprised of the films is used for a long period of time in high temperature or high moisture conditions, the degree of polarization may be degraded, the polarizer and the protective film may be separated, and optical characteristics may be degraded, such that the polarization plate is variably restricted in terms of the purpose thereof.

Also, the TAC film has an in-plane retardation value ($R_{in}$) and a thickness retardation value ($R_{th}$) which are severely changed according to changes in ambient temperature and moisture in the surrounding environment, and, in particular, a retardation value with respect to incident light in a tilt direction is greatly varied. Thus, an application of the polarization plate including the TAC film having the foregoing characteristics as a protective film to an LCD device would result in a degradation of image quality due to the viewing angle characteristics thereof being changed according to a change in the ambient temperature and moisture environment.

Also, the TAC film has a great dimensional variation according to changes in ambient temperature and moisture environments and a relatively high photoelastic coefficient value. Thus, after an evaluation of durability in a heat-resistant, moisture resistant environment, retardation characteristics may be changed locally to thereby degrade image quality. An acrylic resin has been well known as a material for complementing the various shortcomings of the TAC film. However, the acrylic resin does not have sufficient heat resistance characteristics, and creates a retardation in in-plane and thickness directions after being stretched, and therefore is not appropriate to be applied as a protective film.

Thus, in order to solve the problem of the related art, a method for preparing an acrylic copolymer resin having little retardation in the in-plane and thickness directions, a small photoelastic coefficient, and excellent heat resistance, even after being stretched, to be used as a polarizer protective film, is required.

DISCLOSURE

Technical Problem

An aspect of the present invention provides a method for preparing an acrylic copolymer resin having excellent thermal stability, transparency, and optical physical properties.

Technical Solution

According to an aspect of the present invention, there is provided a method for preparing an acrylic copolymer resin for an optical film, including: suspension-polymerizing an acrylic monomer containing a benzene ring, an alkyl(meth)acrylate monomer, and a (meth)acrylic acid monomer to prepare an acrylic copolymer; and thermally treating the copolymer at a temperature ranging from 240° C. to 300° C.

The suspension-polymerizing may include: a first polymerization operation of performing suspension polymerization at an initial reaction temperature ranging from 60° C. to 90° C. for two to three hours; and a second polymerization operation of increasing the temperature by 5° C. to 20° C., based on the temperature of the first polymerization operation, and additionally performing polymerization for one to two hours.

For example, the second polymerization operation may be performed at a temperature ranging from 80° C. to 100° C.

In the preparing of the acrylic copolymer, 3 to 15 weight parts of an acrylic monomer containing a benzene ring, 65 to 92 weight parts of an alkyl(meth)acrylate monomer, and 5 to 20 weight parts of a (meth)acrylic acid monomer may be suspension-polymerized.

In the preparing of the acrylic copolymer, 3 to 15 weight parts of a benzylmethacrylate, 65 to 92 weight parts of a methylmethacrylate monomer, and 5 to 20 weight parts of a methacrylic acid monomer may be suspension-polymerized.

The acrylic monomer containing a benzene ring may be selected from the group consisting of benzyl methacrylate, 1-phenylethyl methacrylate, 2-phenoxyethyl methacrylate, 2-phenylethyl methacrylate, 3-phenylpropyl methacrylate, 3-phenylpropyl acrylate, and 2-phenoxyethyl acrylate.

The alkyl group of the alkyl(meth)acrylate monomer may have 1 to 10 carbon atoms.

The alkyl(meth)acrylate monomer may be selected from the group consisting of methylacrylate, ethylacrylate, methylmethacrylate, ethylmethacrylate, methylethacryate, and ethylethacrylate.

The (meth)acrylic acid monomer may be selected from the group consisting of acrylic acid, methacrylic acid, methylacryl acid, methylmethacrylic acid, ethylacrylic acid, ethylmethacrylic acid, butylacrylic acid, and butylmethacrylic acid.

The acrylic copolymer resin for an optical film obtained by the preparation method may include glutaric anhydride.

The acrylic copolymer resin for an optical film obtained through the preparation method may include 3 to 15 weight parts of an acrylic unit containing a benzene ring, 65 to 92 weight parts of an alkyl(meth)acrylate unit, 0 to 4 weight parts of a (meth)acrylic acid unit, and 5 to 16 weight parts of a glutaric anhydride unit, over 100 weight parts of the acrylic copolymer resin.

A glass transition temperature of the acrylic copolymer resin may be 120° C. or higher.

Haze of the acrylic copolymer resin may range from 0.1 to 1%, and transmittance thereof may be 90% or more.

The thermal treatment may be performed as an extrusion operation.

The extrusion operation may be performed by performing a re-extrusion two to five times by using a twin screw extruder.

The extrusion operation may be performed in vacuum at a pressure lower than 40 torr.

According to another aspect of the present invention, there is provided a method for fabricating an optical film, including: suspension-polymerizing an acrylic monomer containing a benzene ring, an alkyl(meth)acrylate monomer, and a (meth)acrylic acid monomer to prepare an acrylic copolymer; thermally treating the acrylic copolymer at a temperature ranging from 240° C. to 300° C.; extruding the acrylic copolymer to fabricate a film; and stretching the film.

The operation for preparing the acrylic copolymer may be the same as described above, and thermally treating the acrylic copolymer and extruding the acrylic copolymer to fabricate a film may be performed as a single operation.

The extrusion operation may be performed by performing a re-extrusion two to five times by using a twin screw extruder.

In the stretching operation, the film may be stretched in a vertical direction (i.e., in a mechanical direction (MD)) so as to be double and then stretched biaxially in a horizontal direction (i.e., in a transverse direction (TD)) so as to be triple.

The optical film having an in-plane retardation value represented by Equation 1 shown below and a thickness retardation value represented by Equation 2 shown below may range from −5 to 5 nm respectively:

$$R_{in}=(n_x-n_y)\times d \quad \text{[Equation 1]}$$

$$R_{th}=(n_z-n_y)\times d \quad \text{[Equation 2]}$$

In Equation 1 and Equation 2, $n_x$ is a refractive index in a direction in which the refractive index is the greatest in the in-plane direction, $n_y$ is a refractive index in a direction perpendicular to the $n_x$ direction in the in-plane direction, $n_z$ is a refractive index in a thicknesswise direction, and d is the thickness of the film.

The optical film may have a coefficient of thermal expansion (CTE) of 70 ppm/° C. or lower.

Advantageous Effects

As set forth above, with the method for preparing an acrylic copolymer resin and a method for fabricating an optical film using the same according to the present invention, a resin having an effectively lowered CTE and an optical film can be manufactured by inducing the formation of a glutaric anhydride structure by using suspension polymerization that facilitates adjustment of the molecular weight of a resin.

BEST MODE

An aspect of the present invention provides a method for preparing an acrylic copolymer resin for an optical film, including: suspension-polymerizing an acrylic monomer containing a benzene ring, an alkyl(meth)acrylate monomer, and a (meth)acrylic acid monomer to prepare a copolymer; and thermally treating the copolymer at a temperature ranging from 240° C. to 300° C.

The copolymer may be a block copolymer or a random copolymer, but the form of the copolymer is not limited thereto.

In an embodiment of the present invention, preparation of an acrylic copolymer may use suspension polymerization, and here, suspension polymerization includes any suspension polymerization methods generally used in the related art. For example, in a suspension polymerization method, a raw material monomer is dispersed in an immiscible liquid such as water and polymerized by adding an initiator, or the like, thereto. With this method, heat generated as a polymer is polymerized is transferred to the immiscible liquid, facilitating controlling of heating and adjusting of molecular weight in relation to toughness. Preferably, an immerscible liquid that may be used in an embodiment of the present invention is water.

Preferably, the suspension-polymerization operation may be performed by including a first polymerization operation of performing suspension polymerization at an initial reaction temperature ranging from 60° C. to 90° C. for two to three hours and a second polymerization operation of increasing the temperature to 80° C. to 100° C. and additionally performing polymerization for one to two hours.

The first polymerization operation of performing suspension polymerization at the initial reaction temperature satisfies a condition of an initiator used in the related art. If the initial reaction temperature is lower than 60° C., it may not be able to effectively secure a polymerization conversion ratio, and if the initial reaction temperature exceeds 90° C., there may be a problem in controlling an initial reaction such as heat controlling. In the first polymerization operation, a reaction temperature may be set according to a half-life of the initiator and a reaction duration may be adjusted to be two to three hours. The reaction duration is related to efficiency, which is not particularly limited so long as it is within a range in which an appropriate polymerization level is obtainable; however, since it is more effective as the reaction duration is shorter, the reaction duration may be two to three hours.

Thereafter, the conversion ratio may be enhanced by the second polymerization operation in which the temperature is increased and polymerization is additionally performed. The temperature in the second polymerization operation may be increased to be higher by about 5° C. to 20° C., preferably, by 10° C., based on the initial polymerization temperature in the aspect of completing the polymerization of an unreacted monomer. Specifically, the second polymerization operation is preferably performed at a temperature ranging from 80° C. to 100° C. If the additional polymerization operation is performed at a temperature lower than 80° C., efficiency in completing the polymerization may be degraded, and if the additional polymerization operation is performed at a temperature higher than 100° C., it may be difficult to control a reaction such as a rise in temperature. Preferably, in terms of efficiency, the reaction duration is one to two hours.

In an embodiment of the present invention, in order to enhance toughness of a stretched film, a resin is prepared by using suspension polymerization facilitating the adjustment of molecular weight of the resin, and since the heat treatment operation is included, a formation of glutaric anhydride may be induced by providing thermal history to the resin.

In the thermal treatment operation of the present embodiment, the prepared copolymer is heated to a temperature ranging from 240° C. to 300° C., and preferably, to a temperature ranging from 260° C. to 290° C. If the temperature for the thermal treatment operation is lower than 240° C., glutaric anhydride may not be effectively generated, and if the temperature for the thermal treatment operation exceeds 300° C., there may be a problem with stability in relation to resin decomposition.

In the case of the suspension polymerization, since there may be a limitation in the process of applying heat as water is used, and since the resin is obtained through a dehydration process, the thermal treatment operation may be performed as an extrusion operation. Namely, it is preferable in terms of process that the copolymer obtained in the form of granule according to the outcome of the suspension polymerization is hot-extruded at a temperature ranging from 240° C. to 300° C. so as to be prepared. In this case, more preferably, the copolymer is re-extruded two to five times by using a twin screw extruder, but the number of re-extrusions may vary, depending on the temperature and the length of the extruder, and an amount of extrusions exceeding five times is not desirable in terms of stability, according to resin degradation.

In particular, preferably, the copolymer is re-extruded two or more times by using the twin screw extruder with the screws having a length of about 1 m, but a single extrusion may be performed according to a provided temperature range and device, or a single screw extruder may be used under conditions in which heat transmission and extrusion are effectively performed.

Meanwhile, the extrusion process may be preferably performed in a vacuum state, and more preferably, performed in a state in which the degree of vacuum is less than 40 torr. Since, in an embodiment of the present invention, glutaric anhydride is generated through the foregoing extrusion process, a higher efficiency than a case in which methanol, or the like, generated in the conversion reaction is removed in a vacuum can be obtained.

In general, when a film is fabricated by using an acrylic copolymer resin and laminated with a TAC film, or the like, to fabricate a polarization plate, a curling phenomenon in which the polarization plate is bent or distorted due to the difference between the coefficients of thermal expansion of the two films occurs. However, in an embodiment of the present invention, the acrylic copolymer resin including (meth)acrylic acid monomer is thermally treated to induce a generation of glutaric anhydride, thus lowering the coefficient of thermal expansion of the resin.

The acrylic copolymer resin for an optical film prepared as described above may be in a pellet state, and include glutaric anhydride.

The glutaric anhydride unit is generated as an alkyl(meth)acrylate unit and/or an acrylic unit containing a benzene ring, and a (meth)acrylic acid unit react according to the thermal treatment after the preparation of the copolymer. The content of the glutaric anhydride unit within the finally obtained acrylic copolymer for an optical film can be adjusted by regulating the content of the (meth)acrylic acid monomer applied for polymerization and the degree of thermal treatment. In the present disclosure, 'unit' is used to designate a corresponding component that does not exist in the form of a monomer in a case in which a monomer is polymerized to form a copolymer.

The four-composite copolymer including the glutaric anhydride unit has an effect of reducing the coefficient of thermal expansion, which is not found in the three-composite copolymer including the alkyl(meth)acrylate monomer, the acrylic monomer containing a benzene ring, and the (meth)acrylic acid monomer, while maintaining the same excellent retardation characteristics as those of the three-composite copolymer. This is because macromolecule chain rotation is limited by a bulky functional group of the glutaric anhydride.

Preferably, the content of the monomers added for polymerization is 3 to 15 weight parts of an acrylic monomer containing the benzene ring, 65 to 92 weight parts of an alkyl(meth)acrylate monomer, and 5 to 20 weight parts of a (meth)acrylic acid monomer.

When the acrylic monomer containing the benzene rings is out of the given range, there may be a problem in adjusting a retardation of a protective film. Also, if the (meth)acrylic acid monomer is less than 5 weight parts, the content of the generated glutaric anhydride may be insufficient to lower the coefficient of thermal expansion, and if the (meth)acrylic acid monomer exceeds 20 weight parts, thermal stability of the final resin may be increased, resulting in a film becoming brittle when fabricated.

The acrylic monomer containing the benzene ring serves to adjust the retardation in in-plane or thickness directions, such that the acrylic copolymer resin according to an embodiment of the present invention can be appropriately applied as a polarizer protective film. The acrylic monomer containing the benzene ring may be substituted with an aryl group having 6 to 40 carbon atoms, an arylalkyl group having 6 to 40 carbon atoms, an aryloxy group having 6 to 40 carbon atoms, or an aryloxyalkyl group having 6 to 40 carbon atoms. Preferably, the acrylic monomer containing the benzene ring may be (meth)acrylate substituted with an arylalkyl group having 6 to 15 carbon atoms, an aryloxy group having 6 to 10 carbon atoms, or an aryloxyalkyl group having 6 to 15 carbon atoms in terms of transparency.

Preferred examples of the acrylic monomer containing a benzene ring may be selected from the group consisting of benzyl methacrylate, 1-phenylethyl methacrylate, 2-phenoxyethyl methacrylate, 2-phenylethyl methacrylate, 3-phenylpropyl methacrylate, 3-phenylpropyl acrylate, and 2-phenoxyethyl acrylate. Most preferably, the acrylic monomer containing the benzene ring may be benzyl methacrylate.

In the present disclosure, 'alkyl(meth)acrylate monomer' may refer to both an 'alkylacrylate monomer' and an 'alkylmethacrylate monomer'. When optical transparency, compatibility with different resins, processibility, and productivity are taken into consideration, the alkyl group of the alkyl(meth)acrylate monomer has, preferably, 1 to 10 carbon atoms, more preferably, 1 to 4 carbon atoms, and more preferably, is a methyl group or an ethyl group.

In detail, the alkyl(meth)acrylate monomer may include methylacrylate, ethylacrylate, methylmethacrylate, ethylmethacrylate, methylethacryate, ethylethacrylate, and the like. Among them, methylmethacrylate is the most preferable, but the present invention is not limited thereto.

In the present disclosure, the '(meth)acrylic acid monomer' refers to the inclusion of an 'acrylic acid monomer' and a 'methacrylic acid monomer'. The (meth)acrylic acid monomer allows the acrylic copolymer resin according to an embodiment of the present invention to have sufficient thermal stability, and induces generation of glutaric anhydride to thus lower the coefficient of thermal expansion of the resin.

The (meth)acrylic acid monomer may be substituted with an alkyl group having 1 to 5 carbon atoms, or may be unsubstituted. The (meth)acrylic acid monomer may be, for example, acrylic acid, methacrylic acid, methylacryl acid, methylmethacrylic acid, ethylacrylic acid, ethylmethacrylic acid, butylacrylic acid, butylmethacrylic acid, or the like. Among these, the use of methacrylic acid is most economical.

Meanwhile, preferably, the acrylic copolymer resin for an optical film obtained through the foregoing preparation method includes 3 to 15 weight parts of an acrylic unit containing a benzene ring, 65 to 92 weight parts of an alkyl(meth)acrylate unit, 0 to 4 weight parts of a (meth)acrylic acid unit, and 5 to 16 weight parts of a glutaric anhydride unit.

When the glutaric anhydride is less than 5 weight parts over 100 weight parts of the overall copolymer resin, the copolymer resin may not be effective to lower the coefficient of thermal expansion, and in order to prepare the copolymer resin in which the content of glutaric anhydride exceeds 16 weight parts over 100 weight parts of the overall copolymer resin, the content of acrylic acid may be required to be increased. In this case, however, thermal stability may be increased to be so high as to make the final film brittle. Thus, preferably, a great deal of acrylic acid is converted into glutaric anhydride, after polymerization, to lower the coefficient of thermal expansion.

A weight-average molecular weight of the acrylic copolymer resin preferably ranges from 50000 to 500000 in terms of thermal stability, processibility, and productivity, and more preferably, from 50000 to 200000.

A glass transition temperature Tg of the acrylic copolymer resin may preferably be 120° C. or higher, and more preferably, 125° C. or higher.

According to an embodiment of the present invention, there is provided a method for fabricating an optical film, including: suspension-polymerizing an acrylic monomer containing a benzene ring, an alkyl(meth)acrylate monomer, and a (meth)acrylic acid monomer to prepare an acrylic copolymer; thermally treating the acrylic copolymer at a temperature ranging from 240° C. to 300° C.; extruding the acrylic copolymer to fabricate a film; and stretching the film.

The suspension-polymerizing an acrylic monomer containing a benzene ring, an alkyl(meth)acrylate monomer, and a (meth)acrylic acid monomer to prepare an acrylic copolymer, and thermally treating the acrylic copolymer at a temperature ranging from 240° C. to 300° C. have previously been described.

Preferably, the thermally treating and the extruding the acrylic copolymer to fabricate a film are performed as a single operation. Namely, it is preferable, in terms of process, that a copolymer obtained in the form of granules according to the outcome of the suspension polymerization is hot-extruded at a temperature ranging from 240° C. to 300° C. to fabricate a film.

A film may be fabricated with the acrylic copolymer resin by a method well known in the art such as a caster method, or the like, but the extrusion method, which is economical, is desirous. In the extruding operation, preferably, the copolymer is re-extruded two to five times by using a twin screw extruder, but a single extrusion may be performed according to a provided temperature range and device, or a single screw extruder may be used under conditions in which heat transmission and extrusion are effectively performed.

In case of fabricating an optical film by using the acrylic copolymer resin of the present invention, uni-axially or bi-axially stretching the film may be additionally performed. As for the stretching process, stretching in a mechanical direction (MD) (or a vertical direction) and stretching in a transverse direction (TD) (or a horizontal direction) may be separately performed, or both may be performed together. When both vertical and horizontal stretching operations are performed, any one of vertical stretching and horizontal stretching may first be performed and then the stretching in the other direction may be performed. Alternatively, vertical and horizontal stretching may be simultaneously performed. Stretching may be performed in a single stage or in multiple stages. In the case of vertical stretching, the stretching may be performed according to difference between the speeds of rollers, and in the case of horizontal stretching, a tenter may be used. A rail initiation angle of the tenter is generally within 10 degrees to restrain a bowing phenomenon occurring in the event of horizontal stretching, and to control the angle of an optical axis regularly. The same bowing restraining effect can also be obtained by performing multistage horizontal stretching. In the stretching operation, preferably, the film may be stretched in a vertical direction (i.e., in a mechanical direction (MD)) so as to be double and then stretched biaxially in a horizontal direction (i.e., in a transverse direction (TD)) so as to be triple. A conditioner may be added according to circumstances, to fabricate a film.

When a glass transition temperature of the copolymer resin is Tg, the stretching may be performed at a temperature ranging from (Tg−20° C.)~(Tg+30° C.). The glass transition temperature refers to a temperature range starting from a temperature at which a storage modulus of the copolymer resin starts to be lowered so a loss modulus starts to be increased to be greater than the storage modulus to a temperature at which orientation of polymer chains is lessened to be lost. The glass transition temperature may be measured by a differential scanning calorimetry (DSC). Preferably, the temperature at the time of the stretching process may be a glass transition temperature of the film.

The optical film fabricated as described above having an in-plane retardation value represented by Equation 1 shown below and a thickness retardation value represented by Equation 2 shown below may range from −5 to 5 nm.

$$R_{in}=(n_x-n_y)\times d \quad \text{[Equation 1]}$$

$$R_{th}=(n_z-n_y)\times d \quad \text{[Equation 2]}$$

In Equation 1 and Equation 2, $n_x$ is a refractive index in a direction in which the refractive index is the greatest in the in-plane direction, $n_y$ is a refractive index in a direction perpendicular to the $n_x$ direction in the in-plane direction, $n_z$ is a refractive index in a thicknesswise direction, and d is the thickness of the film.

The thickness of the optical film fabricated as described above may range from 20 to 200 μm, preferably, range from 40 to 120 μm, and have transparency (haze) ranging from 0.1 to 1% and transmittance of 90% or more.

Meanwhile, preferably, the optical film has a coefficient of thermal expansion (CTE) of 70 ppm/° C. or lower. When the CTE exceeds 70 ppm/° C., curling may be generated when the polarization plate is laminated.

When the thickness, transparency, and transmittance of the film are within the foregoing ranges, in case of using the optical film according to an embodiment of the present invention as a protective film of a polarizer, image quality is not degraded.

MODE FOR INVENTION

Hereinafter, the present invention will be described in detail through the following embodiments. However, the following embodiments are merely illustrative, and the scope of the present invention is not intended to be limited by the following embodiments.

Embodiment 1

A mixture obtained by mixing 0.05 weight parts of 5% polyvinylalcohol aqueous solution, 200 weight parts of water, 0.08 weight parts of t-hexyl peroxy-2-ethylhexanoate as an initiator, 0.2 weight parts of t-dodecyl mercaptan, and 0.1 weight parts of NaCl with respect to 85 weight parts of methyl methacrylate (MMA), 5 weight parts of benzyl methacrylate (BzMA), and 10 weight parts of methacrylic acid (MAA) was prepared.

The prepared mixture was primarily suspension-polymerized at an initial reaction temperature of 80° C. for two hours, and then, the temperature was raised to 95° C. to perform secondary polymerization on the resultant material for one hour. The resultant material was then cleansed and dried to fabricate MMA-BzMA-MAA beads.

The obtained beads were re-extruded twice through a co-rotating twin screw extruder at 270° C. to prepare a resin in a state of pellet, and at this time, the degree of vacuum (Torr) was 20. The composition of the final resin is shown in Table 1 below and the physical properties of the final resin are shown in Table 3 below.

After the fabricated pellet was dried, an extruded film having a thickness of 180 μm was fabricated by using an extruder including a T-die. The fabricated film was stretched in a mechanical direction (MD) so as to be double and then stretched biaxially in a transverse direction (TD) so as to be triple, thus fabricating a film having a thickness of 60 μm, and TAC and PVA were bonded to the film to fabricate a polarization plate. The physical properties of the film fabricated thusly are shown in Table 5 below.

Embodiment 2

Except that the number of extrusions was three, a resin was fabricated through the same process as that of Embodiment 1. The composition of the final resin is shown in Table 1, the physical properties of the final resin are shown in Table 3, and the physical properties of the film are shown in Table 5.

Embodiment 3

Except that 82 weight parts of methyl methacrylate (MMA), 10 weight parts of benzyl methacrylate (BzMA), and 8 weight parts of methacrylic acid (MAA) were used, a resin was prepared through the same process as that of Embodiment 1. The composition of the final resin is shown in Table 1, the physical properties of the final resin are shown in Table 3, and the physical properties of the film are shown in Table 5.

Embodiment 4

Except that 82 weight parts of methyl methacrylate (MMA), 10 weight parts of benzyl methacrylate (BzMA), and 8 weight parts of methacrylic acid (MAA) were used and that the number of extrusions was three, a resin was fabricated through the same process as that of Embodiment 1. The composition of the final resin is shown in Table 1, the physical properties of the final resin are shown in Table 3, and the physical properties of the film are shown in Table 5.

Embodiment 5

Except that 77 weight parts of methyl methacrylate (MMA), 8 weight parts of benzyl methacrylate (BzMA), and 15 weight parts of methacrylic acid (MAA) were used and that first polymerization was performed at an initial reaction temperature of 90° C. and second polymerization was performed at the same temperature 90° C., without increasing the temperature, a resin was fabricated through the same process as that of Embodiment 1. The composition of the final resin is shown in Table 1, the physical properties of the final resin are shown in Table 3, and the physical properties of the film are shown in Table 5.

Embodiment 6

Except that 82 weight parts of methyl methacrylate (MMA) and 8 weight parts of benzyl methacrylate (BzMA) were used, a resin was fabricated through the same process as that of Embodiment 1. The composition of the final resin is shown in Table 1, the physical properties of the final resin are shown in Table 3, and the physical properties of the film are shown in Table 5.

Embodiment 7

Except that 78 weight parts of methyl methacrylate (MMA), 10 weight parts of benzyl methacrylate (BzMA), and weight parts of methacrylic acid (MAA) were used and that first polymerization was performed at an initial reaction temperature of 90° C., a resin was prepared through the same process as that of Embodiment 1. The composition of the final resin is shown in Table 1, the physical properties of the final resin are shown in Table 3, and the physical properties of the film are shown in Table 5.

Comparative Example 1

Except that 90 weight parts of methyl methacrylate (MMA), 0 weight parts of benzyl methacrylate (BzMA), and 10 weight parts of methacrylic acid (MAA) were used, a resin was prepared through the same process as that of Embodiment 1. The composition of the final resin is shown in Table 2, the physical properties of the final resin are shown in Table 4, and the physical properties of the film are shown in Table 6.

Comparative Example 2

Except that an extrusion process was not performed, a resin was fabricated through the same process as that of Embodiment 1. The composition of the final resin is shown in Table 2, the physical properties of the final resin are shown in Table 4, and the physical properties of the film are shown in Table 6.

Comparative Example 3

Except that extrusion was performed three times at an extrusion temperature of 200° C., a resin was fabricated through the same process as that of Embodiment 1. The composition of the final resin is shown in Table 2, the physical properties of the final resin are shown in Table 4, and the physical properties of the film are shown in Table 6.

Comparative Example 4

Except that extrusion was performed once at an extrusion temperature of 250° C., a resin was fabricated through the same process as that of Embodiment 1. The composition of the final resin is shown in Table 2, the physical properties of the final resin are shown in Table 4, and the physical properties of the film are shown in Table 6.

Comparative Example 5

Except that 78 weight parts of methyl methacrylate (MMA), 10 weight parts of benzyl methacrylate (BzMA), and weight parts of methacrylic acid (MAA) were used and that first polymerization was performed at an initial reaction temperature of 90° C. and second polymerization was performed at the same temperature 90° C. without increasing the temperature, and that an extrusion process was not performed, a resin was prepared through the same process as that of Embodiment 1. The composition of the final resin is shown in Table 2, the physical properties of the final resin are shown in Table 4, and the physical properties of the film are shown in Table 6.

Comparative Example 6

Except that 90 weight parts of methyl methacrylate (MMA), 10 weight parts of benzyl methacrylate (BzMA), and 0 weight parts of methacrylic acid (MAA) were used and that first polymerization was performed at an initial reaction temperature of 90° C. and second polymerization was performed at 95° C., and that an extrusion process was not performed, a resin was prepared through the same process as that of Embodiment 1. The composition of the final resin is shown in Table 2, the physical properties of the final resin are shown in Table 4, and the physical properties of the film are shown in Table 6.

Experimental Example 1

Evaluation of Physical Properties of Final Resin

The compositions of the final resins and physical evaluation method of the final resin were as follows.

1. Weight-average molecular weight (Mw): The prepared resin was dissolved in tetrahydropurane and measured by using gel permeation chromatography (GPC).
2. Tg (Glass transition temperature): Measured by using a Pyris 6 DSC from Perkin Elmer Inc.
3. Haze and light transmittance: Measured based on an ASTM 1003 method.
4. Composition of final resin: Measured by using $C^{13}$-NMR.

TABLE 1

| Final resin composition | Embodiment 1 | Embodiment 2 | Embodiment 3 | Embodiment 4 | Embodiment 5 | Embodiment 6 | Embodiment 7 |
|---|---|---|---|---|---|---|---|
| BzMA | 6 | 6.1 | 10.2 | 10.2 | 8.4 | 8.3 | 10.1 |
| MMA | 84.2 | 84.2 | 81.7 | 81.5 | 77.5 | 81.7 | 78.2 |
| MAA | 2.2 | 1.2 | 1.6 | 1.1 | 2.8 | 1.7 | 2.0 |
| G/A | 7.6 | 8.5 | 6.5 | 7.2 | 11.3 | 8.3 | 9.7 |

* BzMA: Benzyl methacrylate
* MMA: Methyl methacrylate
* MAA: Methacrylic acid
* G/A: Glutaric anhydride

TABLE 2

| Final resin composition | Comparative Example 1 | Comparative Example 2 | Comparative Example 3 | Comparative Example 4 | Comparative Example 5 | Comparative Example 6 |
|---|---|---|---|---|---|---|
| BzMA | 0 | 5.9 | 5.8 | 5.9 | 8.3 | 10.2 |
| MMA | 90.3 | 84.4 | 84.5 | 84.5 | 77.5 | 88.7 |
| MAA | 1.8 | 9.7 | 7.5 | 7.3 | 14.2 | 0 |
| G/A | 7.9 | 0 | 2.2 | 2.3 | 0 | 1.1 |

TABLE 3

| Physical properties of resin | Embodiment 1 | Embodiment 2 | Embodiment 3 | Embodiment 4 | Embodiment 5 | Embodiment 6 | Embodiment 7 |
|---|---|---|---|---|---|---|---|
| Mw | 120000 | 118000 | 130000 | 129000 | 103000 | 122000 | 115000 |
| Tg (° C.) | 128 | 129 | 123 | 124 | 129 | 124 | 126 |

TABLE 3-continued

| Physical properties of resin | Embodiment 1 | Embodiment 2 | Embodiment 3 | Embodiment 4 | Embodiment 5 | Embodiment 6 | Embodiment 7 |
|---|---|---|---|---|---|---|---|
| Haze (%) | 0.2 | 0.2 | 0.1 | 0.2 | 0.3 | 0.2 | 0.2 |
| Light transmittance (%) | 93.4 | 93.3 | 92.7 | 92.6 | 92.1 | 93.2 | 92.2 |

TABLE 4

| Physical properties of resin | Comparative Example 1 | Comparative Example 2 | Comparative Example 3 | Comparative Example 4 | Comparative Example 5 | Comparative Example 6 |
|---|---|---|---|---|---|---|
| Mw | 130000 | 122000 | 121000 | 12000 | 106000 | 123000 |
| Tg (° C.) | 130 | 124 | 125 | 125 | 125 | 103 |
| Haze (%) | 0.2 | 0.3 | 0.2 | 0.2 | 0.4 | 0.2 |
| Light transmittance (%) | 93.3 | 93.1 | 93.1 | 92.9 | 91.3 | 92.1 |

Experimental Example 2

Evaluation of Physical Properties of Film

A method for evaluating the physical properties of the film according to an embodiment of the present invention is as follows.

1. Retardation value ($R_{in}$, $R_{th}$): Measured by using an Elli-SE from Ellipso Tech. Co., Ltd.

2. Toughness: Measured by bending a 60 μm film ten times by hand to check whether or not it would break (⊚: unbroken, ○: broken one to three times, x: broken five or more times)

3. CTE: Measured using a Perkin-Elmer TMA.

TABLE 5

| Physical properties of film | Embodiment 1 | Embodiment 2 | Embodiment 3 | Embodiment 4 | Embodiment 5 | Embodiment 6 | Embodiment 7 |
|---|---|---|---|---|---|---|---|
| $R_{in}/R_{th}$ | 0.3/−0.1 | 0.3/−0.2 | 0.7/−0.9 | 0.7/1.0 | 2.2/−2.5 | 1.6/−0.7 | 1.1/0.1 |
| Toughness | ⊚ | ⊚ | ⊚ | ⊚ | ○ | ⊚ | ⊚ |
| CTE (ppm/° C.) | 58 | 55 | 62 | 59 | 51 | 58 | 54 |

TABLE 6

| Physical properties of film | Comparative Example 1 | Comparative Example 2 | Comparative Example 3 | Comparative Example 4 | Comparative Example 5 | Comparative Example 6 |
|---|---|---|---|---|---|---|
| $R_{in}/R_{th}$ | 10.9/13.1 | 0.4/0.2 | 0.3/0.1 | 0.3/0.1 | 2.0/−2.1 | 1.1/1.3 |
| Toughness | ○ | ⊚ | ⊚ | ⊚ | ⊚ | ○ |
| CTE (ppm/° C.) | 57 | 82 | 78 | 76 | 77 | 81 |

As described above, it was confirmed that when the acrylic copolymer resin and film are fabricated by using the monomer content and process according to embodiments of the present invention, the coefficient of thermal expansion was drastically reduced, and in the case of Comparative Example 1, it was not within the retardation range available for use as a polarizer protective film, although it had a reduced CTE.

Namely, in the present invention, the CTE can be lowered while satisfying the basic conditions with respect to the polarizer protective film such as retardations by polymerizing using particular compositions and contents of monomers and performing a thermal treatment thereupon.

The invention claimed is:

1. A method for preparing an acrylic copolymer resin for an optical film, the method comprising:
   suspension-polymerizing an acrylic monomer containing a benzene ring, an alkyl(meth)acrylate monomer, and a (meth)acrylic acid monomer to prepare an acrylic copolymer; and
   thermally treating the acrylic copolymer at a temperature ranging from 240° C. to 300° C.,
   wherein the suspension-polymerizing comprises:
   a first polymerization operation of performing suspension polymerization at an initial reaction temperature ranging from 60° C. to 90° C. for two to three hours; and
   a second polymerization operation of increasing the temperature by 5° C. to 20° C., based on the temperature of the first polymerization operation, and additionally performing polymerization for one to two hours,
   wherein the acrylic copolymer resin for an optical film obtained by the preparation method includes glutaric anhydride, and
   wherein the acrylic copolymer resin for an optical film obtained through the preparation method includes 3 to 15 weight parts of an acrylic unit containing a benzene ring, 65 to 92 weight parts of an alkyl(meth)acrylate unit, 0 to 4 weight parts of a (meth)acrylic acid unit, and 5 to 16 weight parts of a glutaric anhydride unit, over 100 weight parts of the acrylic copolymer resin.

2. The method of claim 1, wherein the second polymerization operation is performed at a temperature ranging from 80° C. to 100° C.

3. The method of claim 1, wherein, in the preparing of the acrylic copolymer, 3 to 15 weight parts of an acrylic monomer containing a benzene ring, 65 to 92 weight parts of an alkyl(meth)acrylate monomer, and 5 to 20 weight parts of a (meth)acrylic acid monomer are suspension-polymerized.

4. The method of claim 1, wherein, in the preparing of the acrylic copolymer, 3 to 15 weight parts of a benzylmethacrylate monomer, 65 to 92 weight parts of a methylmethacrylate monomer, and 5 to 20 weight parts of a methacrylic acid monomer are suspension-polymerized.

5. The method of claim 1, wherein the acrylic monomer containing a benzene ring is selected from the group consisting of benzyl methacrylate, 1-phenylethyl methacrylate, 2-phenoxyethyl methacrylate, 2-phenylethyl methacrylate, 3-phenylpropyl methacrylate, 3-phenylpropyl acrylate, and 2-phenoxyethyl acrylate.

6. The method of claim 1, wherein the alkyl group of the alkyl(meth)acrylate monomer has 1 to 10 carbon atoms.

7. The method of claim 1, wherein the alkyl(meth)acrylate monomer is selected from the group consisting of methylacrylate, ethylacrylate, methylmethacrylate, ethylmethacrylate, methylethacryate, and ethylethacrylate.

8. The method of claim 1, wherein the (meth)acrylic acid monomer is selected from the group consisting of acrylic acid, methacrylic acid, methylacryl acid, methylmethacrylic acid, ethylacrylic acid, ethylmethacrylic acid, butylacrylic acid, and butylmethacrylic acid.

9. The method of claim 1, wherein a glass transition temperature of the acrylic copolymer resin is 120° C. or higher.

10. The method of claim 1, wherein haze of the acrylic copolymer resin ranges from 0.1 to 1%, and transmittance thereof is 90% or more.

11. The method of claim 1, wherein the thermal treatment is performed as an extrusion operation.

12. The method of claim 11, wherein the extrusion operation is performed by performing a re-extrusion two to five times by using a twin screw extruder.

13. The method of claim 11, wherein the extrusion operation is performed in vacuum at a pressure lower than 40 torr.

* * * * *